United States Patent [19]

Nelson

[11] 4,267,821
[45] May 19, 1981

[54] SOLAR ENERGY COLLECTOR

[76] Inventor: Cecil O. Nelson, 6324 Parsifal Pl., Las Vegas, Nev. 89107

[21] Appl. No.: 922,364

[22] Filed: Jul. 5, 1978

[51] Int. Cl.³ ............................................... F24J 3/02
[52] U.S. Cl. .................................... 126/417; 126/449; 126/450; 126/444
[58] Field of Search ............... 126/270, 271, 449, 444, 126/446, 432, 450, 430, 417; 237/1 A; 165/170

[56] References Cited

U.S. PATENT DOCUMENTS

| 3,303,838 | 2/1967 | Thomason | 126/432 |
|---|---|---|---|
| 3,923,038 | 12/1975 | Cutchaw | 126/433 |
| 3,996,918 | 12/1976 | Quick | 126/270 |
| 4,043,317 | 8/1977 | Scharfman | 126/271 X |
| 4,067,319 | 1/1978 | Wasserman | 126/271 |
| 4,136,672 | 1/1979 | Hallanger | 126/271 |
| 4,175,542 | 11/1979 | Duchene | 126/449 |

Primary Examiner—James C. Yeung
Assistant Examiner—Larry Jones
Attorney, Agent, or Firm—Harvey B. Jacobson

[57] ABSTRACT

A solar energy collector is disclosed including a housing forming a receptacle across which a fluid to be heated can flow and which is divided into a pair of chambers in the direction of fluid flow by a heat exchanging mat including a layer formed partially from an absorbent material and partially from a material having capillarity so as to retain a liquid fed into the layer and cause heating of the liquid by radiation impinging into the receptacle of the housing. A fluid medium, such as air, can be passed through the chamber formed below the aforementioned heat exchange mat to pick up heat from the mat for distribution as desired.

1 Claim, 4 Drawing Figures

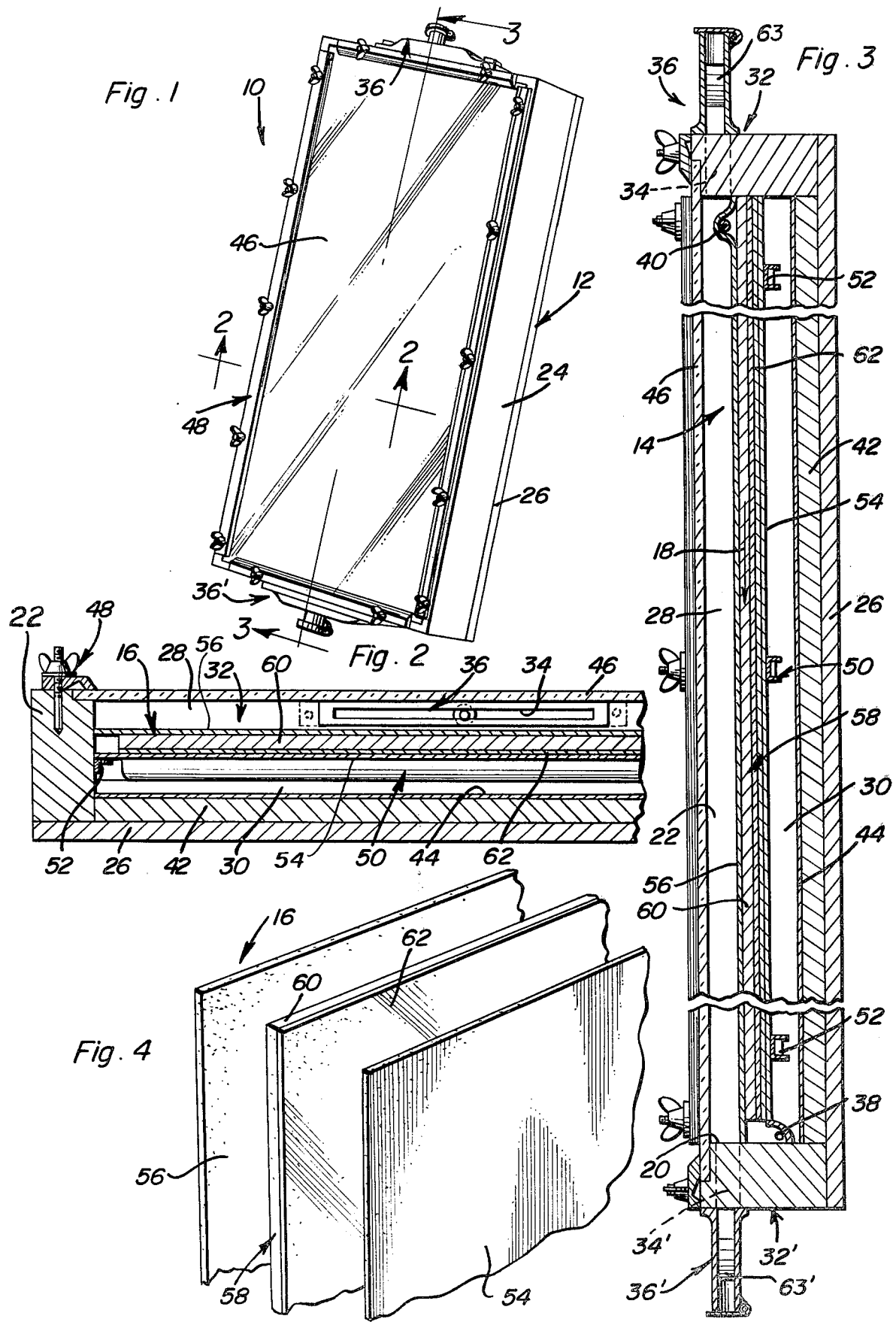

SOLAR ENERGY COLLECTOR

BACKGROUND OF THE INVENTION

1. Field of the Invention

This invention relates generally to solar energy collectors, and particularly to a collector employing a liquid retaining absorbent layer for heating a liquid passing through the absorbing layer.

2. Description of the Prior Art

U.S. Pat. No. 3,387,602, issued June 11, 1968 to H. E. Thomason discloses a solar collector wherein a solar heat collecting overlayer constructed from an asphalt impregnated glass fiber, asbestos, and the like, is arranged immediately beneath a spreader-heat collector material, which may be wire mesh, and the like, with the entire assembly being supported on a barrier and disposed beneath a substantially transparent cover. Further, U.S. Pat. No. 3,960,135, issued June 1, 1976 to D. J. Angilleta, discloses a solar heater and thermal barrier wherein windows are provided at the end of a box-like enclosure of the heater for permitting air flow through the panel. Additional examples of solar heat collectors employing a liquid film for collecting energy from solar radiation can be found in U.S. Pat. Nos. 3,145,707 and 3,254,643, issued Aug. 25, 1964 and June 7, 1966, respectively, to H. E. Thomason.

Further examples of solar heaters which use a film or sheet of water to effect heat transfer can be found in U.S. Pat. Nos. 842,658, issued Jan. 29, 1907 to C. L. Haskell; 3,561,425, issued Feb. 9, 1971 to J. G. Gardner; 3,965,887, issued June 29, 1976 to E. J. Gramer et al; 3,989,031, issued Nov. 2, 1976 to H. E. Thomason et al; 3,995,804, issued Dec. 7, 1976 to C. D. Folds et al; and 4,030,748, issued June 21, 1977 to E. R. Beaver, Jr.

SUMMARY OF THE INVENTION

It is an object of the present invention to provide a solar energy collector using a water flow technique that is more efficient in heat transfer and storage than similar collectors of this kind.

It is another object of the present invention to provide a solar energy collecting mat construction for use with water-trickle solar energy collectors that is more efficient in collecting and storing heated water than known mats for this purpose.

These and other objects are achieved according to the present invention by providing a solar energy collector having: a housing forming a receptacle; a heat exchange mat disposed within the receptacle for absorbing solar energy and storing same; and a fluid flow path disposed passing through the receptacle and beneath the heat exchange mat for collecting heat energy from the mat.

The heat exchange mat preferably includes a first planar sheet constructed from a rigid material and impervious to a liquid, such as water, and a second planar sheet arranged parallel to and coextensive with, but spaced from the first planar sheet, and constructed from a material having a high heat absorbing capacity. A planar liquid absorbing layer is disposed between the first planar sheet and the second sheet for absorbing a liquid run between two sheets of the heat exchange mat. This planar layer advantageously comprises a sublayer of a porous non-woven material, such as felt, and a sublayer of a material having good capillarity, such as a wick-like material, with these two sublayers being disposed in abutting, substantially parallel, coextensive arrangement, but of slightly smaller dimensions than planned in the first planar sheet and second planar sheet so as not to contact side walls of the associated housing.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic, perspective view showing a solar heat collector according to the present invention.

FIG. 2 is an enlarged, fragmentary, sectional view taken generally along the line 2—2 of FIG. 1.

FIG. 3 is an enlarged, fragmentary, sectional view taken generally along the line 3—3 of FIG. 1.

FIG. 4 is a fragmentary, exploded, perspective view showing the various layers of a heat exchange water-trickle mat which includes a liquid absorbing layer constructed in accordance with the present invention.

DESCRIPTION OF THE PREFERRED EMBODIMENTS

Referring now more particularly to the figures of the drawings, a solar energy collector 10 according to the present invention comprises a housing 12 in the configuration of a rectangular parallelepiped having a receptacle 14 provided therein. A heat exchanging or absorbing mat 16 is disposed within receptacle 14 for absorbing impinging solar energy and heating a liquid trickling through mat 16 along a flow path 18.

Housing 12 has an open top 20 permitting access to receptacle 14, and is further formed by a plurality of side walls 22 and 24 connected to and extending longitudinally of substantially parallel edges of a bottom wall 26 of housing 12. Mat 16 is disposed within receptacle 14 so as to be substantially parallel to, but spaced from, bottom wall 26, and effectively divides receptacle 14 into a pair of chambers 28 and 30.

Headers 32 and 32' form end walls of housing 12 and are arranged extending between respective side walls 22 and 24. Each of the headers 32, 32' is provided with a respective opening 34, 34' surrounding which is disposed a fitting 36, 36'. Mat 16 extends from header 32 toward, but spaced from header 32', and terminates at a trough 38 provided with a suitable opening for draining therefrom the liquid, such as water, which is emitted from a perforated tube 40 disposed within mat 16 and extending between the side walls 22 and 24, adjacent header 32 of housing 12. As can be appreciated, water can trickle from tube 40 downwardly through mat 16 and be drained off at trough 38 for distribution or storage. Further, this liquid can be recycled. As will be described below, however, mat 16 will retain a certain amount of the liquid trickled therethrough in such a manner as to provide great efficiency of heat transfer of mat 16, and therefore collector 10.

A layer of suitable thermal insulation 42 is provided on bottom wall 26 of housing 12, with a reflective sheet 44, such as aluminum foil, being disposed covering insulation 42. A suitable sheet of glass 46, and the like, is disposed over the open top 20 of housing 12, with suitable ledges being advantageously provided in side wall 22, 24 and headers 32, 32', for receiving the glass, and the sheet being retained thereon as by clamps 48, which may be the glazing hold-down clamps disclosed in my co-pending application Ser. No. 825,850, filed Aug. 18, 1977, now U.S. Pat. No. 4,133,159, issued Jan. 9, 1979.

Mat 16 is advantageously retained in position bisecting receptacle 14 by a plurality of transversely arranged slats 50 attached to the side walls 22, 24 by the illustrated right-angled brackets 52 so as to extend between the slats 50.

Mat 16 includes a first planar sheet 54 constructed from a rigid material impervious to fluid, such as a sheet of suitable metal, and a second planar sheet 56 arranged substantially parallel to and coextensive with, but spaced from, sheet 54. Sheet 56 is constructed from a material having a high heat absorbing capacity, and again may be a sheet of suitable metal having colored black that surface which is directed toward open top 20 of housing 12. A planar liquid absorbing layer 58 is disposed between sheets 54 and 56, and comprises a first sublayer 60 constructed from a porous non-woven material, such as wool felt and the like, and a second sublayer 62 constructed of a material having good capillarity, or being wick-like. The latter material may be conventional blotting paper. The sublayers 60, 62 are disposed in abutting, coextensive relation, with the width of the layer 58 being less than the widths of sheets 54 and 56 so that layer 58 does not contact the side walls 22 and 24. Further, layer 58 should not contact the header 32'.

In operation, a predetermined flow of water or other suitable liquid is passed into perforated tube 40 and then permitted to flow onto layer 58 of mat 16, which layer 58 will soak up the water and cause same to spread out evenly. As the water increases in volume, the water will filter down freely through the porous sublayer 60 of layer 58. The water flowing downwardly, as by the force of gravity inasmuch as the collector 10 should be disposed at an angle as seen in FIG. 1, will be heated by the mat 16 which has been heated by impinging solar radiation passing through the sheet of glass 46 and into chamber 28. The heated water will now empty into the trough 38, where the water will be distributed to an appropriate use or to storage as desired. Because the layer 58 does not contact the side walls 22 and 24, the water will not flow down the edges adjacent these side walls 22, 24.

If the temperature surrounding collector 10 falls a few degrees below freezing, slush may form on the sublayer 62 of layer 58 of mat 16, but this slush will quickly melt when solar radiation heats the overlying heat absorbing sheet 56 of mat 16. In a cold area, a heating element (not shown) may be placed in chamber 30 and turned on when required. A suitable mixture of a conventional anti-freeze liquid and distilled water may be used in conjunction with solar collector 10, provided the proper equipment, such as a suitable heat exchanger (not shown), is inserted into the related system.

Opening 34 forms a passageway between the manifold-forming fitting 36 and chamber 28, while a conventional hinged damper 63 is disposed in opening 34 to regulate the flow of air, and the like, through chamber 28. The purpose of the manifolds included in the headers 32 and 32' is to handle excessive head build up, especially that due to improper pumps or valves or due to power failures. In the event of such malfunctions, cool air can enter through header 32' and circulate upwardly through the slanted chamber 28 and radiate to the atmosphere aloft through header 32. If desired, a small duct fan (not shown) may be installed in the neck of fitting 36 to gently assist in the flow of air. A damper 63' is disposed in opening 34' to function in a manner similar to damper 63, with it being possible to adjust both dampers 63 and 63' so as to regulate the fluid flow through chamber 28.

Air can also be circulated through chamber 30, if desired, for permitting air to absorb heat from mat 16 and be used for space heating and other similar uses, as considerable heat will be generated in chamber 30. The use of such air, which would normally be recycled, for spacing heating would ordinarily be used only in the event there is sufficient hot water being generated in collector 10, and some space heat is desired.

As can be readily understood from the above description and from the drawings, a solar heat collector according to the present invention permits for solar heating of water in a simple yet highly efficient manner permitting an average residence, and the like, to obtain most of hot water requirements by use of solar energy.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A solar energy collector, comprising, in combination:
   (a) a housing forming a receptacle;
   (b) heat absorbing mat means disposed within the receptacle for absorbing solar energy;
   (c) fluid flow path means passing through the heat absorbing mat means for permitting a fluid medium to pass through the mat means and collect heat energy stored within the mat means, wherein the heat absorbing mat means includes, in combination:
   (1) a first planar sheet constructed from a rigid material impervious to a fluid medium passing through the mat means;
   (2) a second planar sheet arranged substantially parallel to and coextensive with, but spaced from, the first planar sheet, and constructed from a material having a high heat absorbing capacity; and
   (3) a planar fluid absorbing layer disposed between the first planar sheet and second planar sheet and permitting passage of the fluid medium therethrough between the first planar sheet and second planar sheet;
   said housing, and the receptacle formed thereby, are in the form of a rectangular parallelpiped having an open top and including a substantially planar bottom wall, with the first planar sheet being arranged substantially parallel to, but spaced from, the bottom wall of the housing and bisecting the receptacle into a pair of chambers, the one of the chambers being disposed between the heat absorbing mat means and the open top of the housing being usable for removing excess heat from the housing, and the other of the chambers being usable for heating a fluid medium for space heating purposes, said housing further including a pair of substantially parallel, spaced side walls, and a pair of headers positioned between said side walls and forming opposite ends of said housing, with the first planar sheet extending between the side walls and from one of the headers to adjacent, but spaced from, the other of the headers, a trough being provided in the housing and arranged connected to and extending between the first planar sheet and the other of the headers, the trough extending transversely of the extent of the first planar sheet and being provided with a drain, and a liquid source disposed in the mat means arranged extending between the side walls of the housing, with the fluid absorbing layer of the mat means being coextensive with the first planar sheet between the headers, but spaced from the side walls of the housing.

* * * * *